United States Patent

[11] 3,590,973

| [72] | Inventor | Robert P. Sorensen |
| | | Rockford, Ill. |
| [21] | Appl. No. | 767,274 |
| [22] | Filed | Oct. 14, 1968 |
| | | Division of Ser. No. 554,284, May 24, 1966, Pat. No. 3,436,894. |
| [45] | Patented | July 6, 1971 |
| [73] | Assignee | Anderson Bros. Mfg. Co. |
| | | Rockford, Ill. |

[54] CONVEYOR WITH CONTAINER EJECTOR
6 Claims, 8 Drawing Figs.
[52] U.S. Cl. .................................................. 198/25,
198/131, 198/203, 53/112
[51] Int. Cl. .......................................................B65g 47/00,
B65g 15/00

[50] Field of Search............................................. 53/112,
184, 282; 198/144, 131, 185, 25, 27, 203

[56] References Cited
UNITED STATES PATENTS
| 3,102,626 | 9/1963 | Hanes............................ | 198/25 |
| 2,501,473 | 3/1950 | Malvicini........................ | 198/27 |
| 3,299,608 | 1/1967 | Orloff............................. | 53/112 (A) |

Primary Examiner—Richard E. Aegerter
Attorney—McCanna, Morsbach, Pillote & Muir

ABSTRACT: A packaging machine has a conveyor which advances a number of containers from a container denester past a filler, sealing head, and cutter. The conveyor has a plurality of pivotally interconnected pockets which have open bottoms. At the outlet end of the conveyor are provided a plurality of shoes which move through the open bottom of the pockets to eject the containers.

PATENTED JUL 6 1971

Inventor
Robert P. Sorensen
By McCanna, Marsbach, Pillote + Muir
Attys

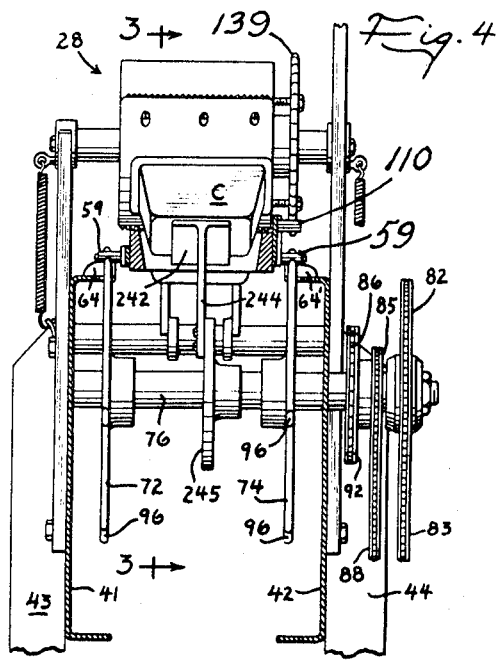
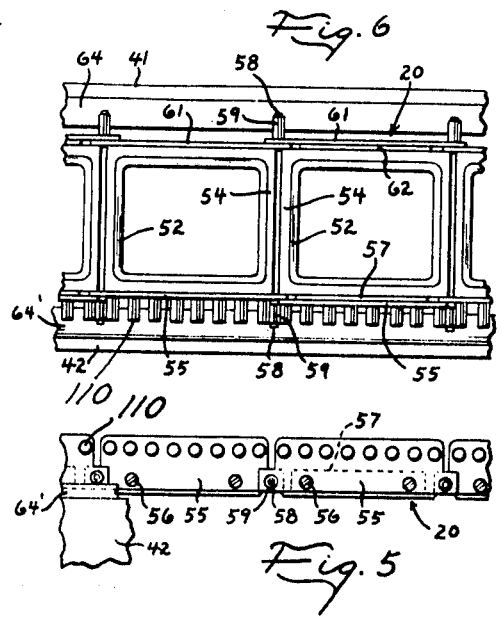
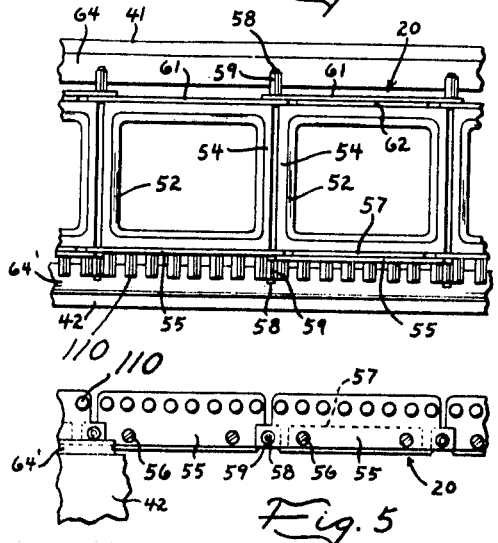
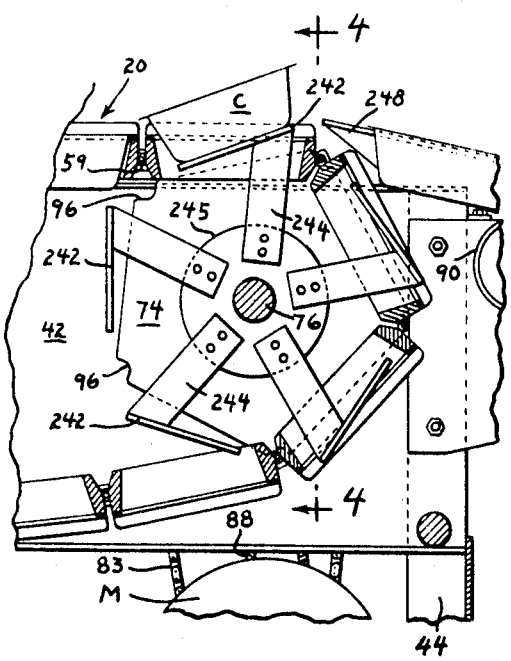
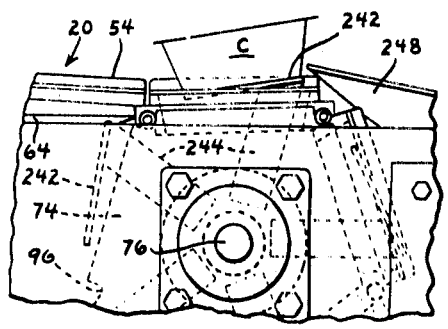

CONVEYOR WITH CONTAINER EJECTOR

CROSS-REFERENCE

This application is a division of application Ser. No. 554,284, filed May 24, 1966 and now U.S. Pat. No. 3,436,894.

BACKGROUND

The invention pertains to power-driven conveyors of the type having a rotary member for article transfer or container ejecting.

SUMMARY

The present invention relates to a conveyor with a container ejector. More particularly, the invention relates to an endless conveyor with open-bottomed pockets and with an improved container ejector for ejecting containers from the pockets.

It is a general object of this invention to provide a conveyor with a container ejector and having increased reliability for removal of the containers.

Other objects and advantages of the present invention will become apparent as the same becomes better understood from the following detailed description when taken in conjunction with the accompanying drawings wherein:

FIG. 3 is a partial longitudinal sectional view taken generally along line 3-3 of FIG. 4;

FIG. 4 is a partial cross-sectional view taken generally along line 4-4 of FIG. 3 and having some parts removed for better illustration;

FIG. 5 is a partial rear elevational view of the conveyor;

FIG. 6 is a top view of the apparatus of FIG. 5;

FIG. 7 is a partial front elevational view; and

Figure 1:
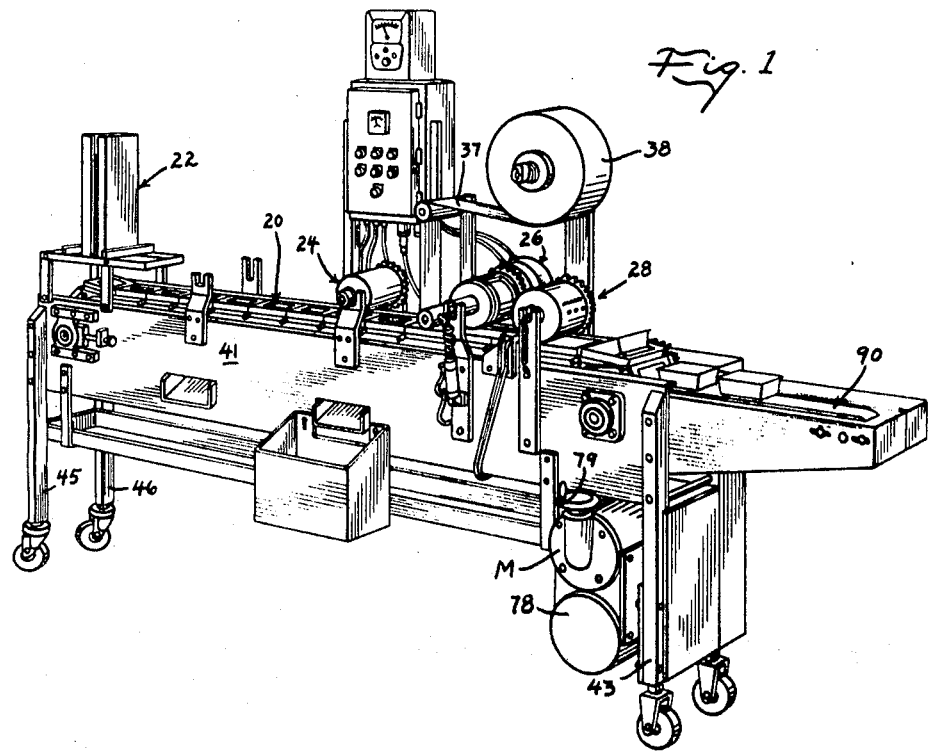
FIG. 1 is a perspective view of an embodiment of this invention.
Figure 8:
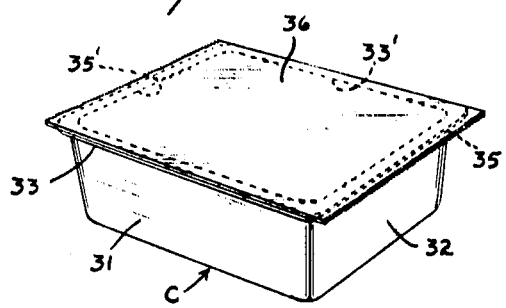
FIG. 8 is a perspective view of one container used with this invention.

Reference is now made more particularly to the drawings which illustrate the best presently known mode of carrying out the invention and wherein similar reference characters indicate the same parts throughout the several views. As best shown in FIG. 1, an apparatus embodying the present invention includes a conveyor means 20 for advancing a number of containers simultaneously and continuously from a container dispenser or denester 22, past a product dispenser or filler 24, a sealing means 26, and a cutting means 28 to the outlet end of the machine. An exemplary package, containing a dispensed product (not shown), is illustrated in FIG. 8 and includes a container C having a bottom wall, sidewalls 31 and end walls 32. At the upper extremity of the sidewalls are longitudinal rims or flanges 33, 33' and, similarly, at the upper extremity of the end walls are laterally extending rims or flanges 35, 35' which define a generally open top. In the embodiment illustrated in FIG. 1, these containers are dispensed by denester 22, filled with a product by filler 24, and have a cover 36 sealed to the flanges by sealing means 26. The covers 36 are advantageously formed from a thin web 37 of heat-sealable material continuously fed from a roll or supply 38. The packages are separated by cutting the web of material in an area between the adjacent containers as by cutting means 28. The general structure of the machine conveniently includes channel-shaped side panels 41, 42 supported on legs 43—46.

Figure 2:
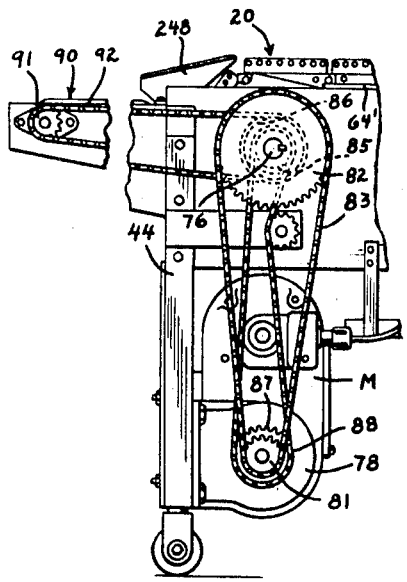
FIG. 2 is a partial rear elevational view of the apparatus illustrated in FIG. 1.

The conveyor means 20 includes a plurality of pockets 52 shaped for receiving the containers C. As illustrated, the pockets have tapered inner sidewalls and a generally open bottom which aids in the removal operation. The pockets are shaped to support the flanges of container C on the upper surface 54 of the pockets which preferably comprises a layer of resilient and heat insulating material to aid in the sealing operation. Preferably, the pockets are swingably connected together in end-to-end relationship to form an endless-type conveyor 20. This is conveniently accomplished by pivotally connecting sideplates attached to the pockets. As shown in FIG. 5, a plate 55 is attached to each pocket as by fasteners 56. The plates on alternate pockets are spaced from the side thereof as by a spacer 57 to allow the plates to overlap. The overlapping portions are pivotally connected by a pin connection 58 upon which is mounted a roller 59. In a similar manner as best shown in FIG. 6, plates 61 are mounted on the other side of the pockets with alternate plates being mounted with a spacer plate 62 to provide a similar overlapping relationship. Plates 61 are likewise pivotally connected by pin connection 58 upon which is mounted a roller 59. The upper flight of the conveyor is supported on rails 64, 64' mounted on the upper flange of side panels 41, 42 respectively, and which are arranged for engagement by rollers 59. In this manner, the pockets are supported at both ends during the entire operation with the exception that the rails end a distance past the cutting means 28 whereby the rollers adjacent the outlet end drop off the rails (see FIG. 7). This arrangement also allows the rollers 59 to be picked up by driven star wheels 72, 74 (see FIGS. 3 and 4). Star wheels 72, 77 are mounted on driven shaft 76 (FIG. 4) which is driven by motor M. Motor M drives a variable speed drive 78 (see FIG. 1) and there is provided a control handle 79 conveniently disposed adjacent the outside of side panel 41 to allow an operator to easily vary the speed of the machine. The variable speed drive drives shaft 76 through sprockets 81 and 82 and chain 83 (FIG. 2). As best shown in FIG. 4, sprockets 85 and 86 are rotatably mounted on shaft 76, sprockets 85 being driven by variable speed drive 78 through sprocket 87 and chain 88. Sprockets 85 and 86 are connected and serve to drive an outlet conveyor, generally designated 90, through sprocket 91 and chain 92.

As indicated above, star wheels 72 and 74 drive the conveyor by engaging rollers 59. While other arrangements are possible, the engagement means is herein illustrated as a plurality of generally U-shaped depressions 96 on the periphery of the star wheels. These depressions are generally equally spaced a distance approximating the spacing of the rollers 59. It will be recognized that when shaft 76 is driven at a generally uniform speed, grooves 96 will rotate at a uniform speed; however, the star wheels will transmit a nonuniform or nonlinear motion to conveyor 20 since the grooves travel in a semicircular path while engaged with rollers 59. While other numbers of engaging means may be employed, it has been found that a particularly advantageous arrangement embodies five grooves 96 on the periphery of the star wheels, as best seen in FIG. 3. It will be recognized that as the number of engaging means increases, the motion of the conveyor more nearly approximates a linear motion.

Reference is now directed further to the construction of the receivers or pockets 52 and particularly to FIGS. 5 and 6. As shown, adjacent the top of plate 55 are a plurality of generally equally spaced teeth shown in the form of laterally extending pins 110. It is deemed obvious that these pins are advanced with the pockets and, as best shown in FIG. 4, a sprocket 139 may be engaged by the pins 110 to drive the cutting means 28. Thus the pins 110 are positively located on each pocket 52 to provide a generally continuous rack.

At the outlet end of the conveyor is provided a means for ejecting the individual container C from the pockets 52, as illustrated in FIGS. 3 and 4. A plurality of shoes 242 are mounted on shaft 76 by means of arms 244 and mounting plate 245 positioned between star wheels 72 and 74. There is a shoe 242 arranged for moving into each pocket 52. It can be seen that shoe 242, when engaged with containers C as shown in FIGS. 3 and 7, is disposed at an angle to the pocket and extends upwardly toward the outlet end of the conveyor. The upper extremity of the shoe is the first portion to enter the pocket and is arranged to lift the outlet end of the container above the pocket as shown. As the pocket moves around the star wheel, the pockets drop and the other end of the shoe is also disposed near the top of the pocket. A means is provided for receiving the containers as they are so ejected and, in the embodiment illustrated, includes a pair of fingers 248 disposed on either side of the container for engaging the underside of the flanges thereof. The fingers 248 are inclined so that the container slides thereon to any convenient receiving means such as the aforementioned outlet conveyor 90.

The invention, in its broader aspects, is not limited to the specific apparatus shown and described but departures may be made therefrom without departing from the principles of the invention and without sacrificing its chief advantages.

What I claim is:

1. In combination, an endless conveyor having inlet and outlet termini and having a plurality of interconnected open-bottom receivers, rotatable means at the termini for entraining the conveyor and providing upper and lower runs, power means for driving the conveyor and rotating the rotatable means, each receiver being shaped for receiving a container therein on the upper run and carrying the same to the outlet terminus, a container ejector rotatably mounted about an axis adjacent the outlet terminus for lifting the containers from the receivers, the container ejector including a plurality of shoes mounted a preselected fixed radial distance from the axis and each arranged for moving into a receiver during rotation of the container ejector while remaining said preselected fixed radial distance from the axis, and when at the top of its rotation each shoe having an upper surface disposed at an angle to the receiver and extending upwardly toward the outlet terminus of the conveyor whereby the upper extremity of the shoe first enters the receiver and lifts the outlet end of the container.

2. The combination of claim 1 wherein the rotatable means at the outlet terminus is coaxial with the container ejector and connected thereto so that they rotate in unison.

3. In a machine for advancing containers along a longitudinal path, the combination of: a longitudinally extending endless conveyor having inlet and outlet termini and including a plurality of open-bottom receivers shaped for receiving at least one container and arranged with ends in juxtaposition, pivotal interconnecting means at each juxtaposed end and having a lateral portion adjacent the lower edges of the receivers and extending beyond each side of the receivers, first and second means at the respective outlet and inlet termini and adjacent the receiver sides for engaging the lateral portions and entraining the conveyor over the first and second means, means for driving one of the first and second means thereby advancing the conveyor, a plurality of generally equally spaced rack teeth rigid with each receiver and adjacent the upper edge thereof, a mechanism engaged with the spaced teeth and driven thereby with the movement of the conveyor, a container ejector at the outlet terminus and rotatably mounted about an axis thereat for lifting the containers from the receivers, the container ejector including a plurality of shoes mounted a preselected fixed radial distance from the axis and rotatable with said first means at the outlet terminus for moving into the receivers to eject the containers from the receivers while remaining said preselected fixed radial distance from the axis, and each shoe having an upper surface disposed at an angle to the receiver and extending upwardly toward the outlet terminus of the conveyor when at the top of its rotation.

4. In combination, an endless conveyor having inlet and outlet termini and having a plurality of interconnected open-bottom receivers, the receivers having laterally spaced sides and longitudinal ends in juxtaposition, the conveyor including pivotal means for pivotally interconnecting the juxtaposed ends of the receivers, rotatable means at the termini for entraining the conveyor and providing upper and lower runs and including a pair of laterally spaced star wheels at the outlet terminus for engaging the pivotal means, power means for driving the conveyor and rotating the rotatable means, each receiver being shaped for receiving a container therein on the upper run and carrying the same to the outlet terminus, a container ejector disposed between the star wheels, means mounting the star wheels and the container ejector for rotation in unison about a common axis, the container ejector including a plurality of shoes fixed in relation to the axis and each arranged for moving into a receiver to lift the container therefrom during rotation of the container ejector, and when at the top of its rotation each shoe having an upper surface disposed at an angle to the receiver and extending upwardly toward the outlet terminus of the conveyor.

5. The combination of claim 4 including a rotatable shaft at the axis of the star wheels and container ejector which are mounted thereon for rotation therewith, and wherein the power means has a driving connection to the shaft to thereby drive the conveyor.

6. In combination, an endless conveyor having inlet and outlet termini and having a plurality of interconnected open-bottom receivers, rotatable means at the termini for entraining the conveyor and providing upper and lower runs, power means for driving the conveyor and rotating the rotatable means, each receiver being shaped for receiving a container therein on the upper run and carrying the same to the outlet terminus, the container having a peripheral flange at the top for supporting the container on the upper surface of the receiver, a container ejector rotatable mounted about an axis adjacent the outlet terminus for lifting the containers from the receivers, the container ejector including a plurality of shoes fixed in relation to the axis and each arranged for moving into a receiver during rotation of the container ejector, and when at the top of its rotation each shoe having an upper surface disposed at an angle to the receiver and extending upwardly toward the outlet terminus of the conveyor and including a pair of fingers disposed above the conveyor at the outlet terminus for receiving the containers as they are ejected from the receivers, the fingers being disposed one at each lateral side of the ejected container for engaging the underside of the flange, and the fingers being inclined downwardly from the conveyor so that the container slides thereon.